Feb. 4, 1930.　　F. J. RAYBOULD　　1,745,954

CONDUIT FITTING

Filed April 4, 1928

INVENTOR.
Frank J. Raybould
BY
ATTORNEYS.

Patented Feb. 4, 1930

1,745,954

UNITED STATES PATENT OFFICE

FRANK J. RAYBOULD, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed April 4, 1928. Serial No. 267,415.

This invention is designed to supply fittings to conduit-receiving openings, particularly openings in the walls of knock-out boxes and the fitting as shown is particularly designed for use with threadless conduits. Features and details of the invention will appear from the specification and claims.

A preferred embodiment of the invention is illustrated in the accompanying drawings as follows:—

Figure 1:
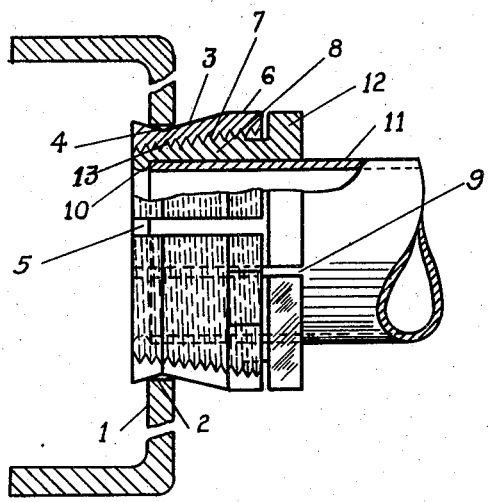

Fig. 1 is a side elevation, partly in section, of the fitting in place.

Figure 2:
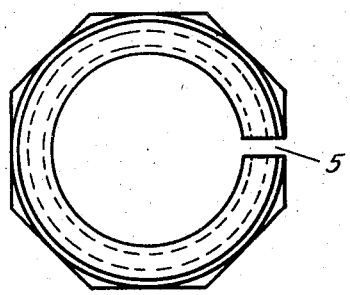

Fig. 2 an end view of the outer expanding sleeve.

Figure 3:
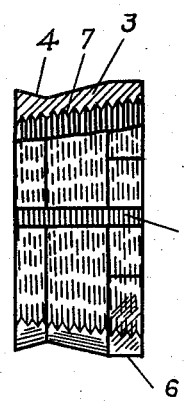

Fig. 3 a side elevation, partly in section, of said sleeve.

Figure 4:
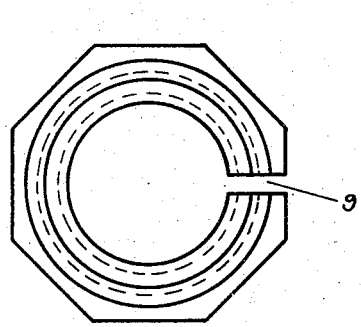

Fig. 4 an end view of the contracting sleeve.

Figure 5:
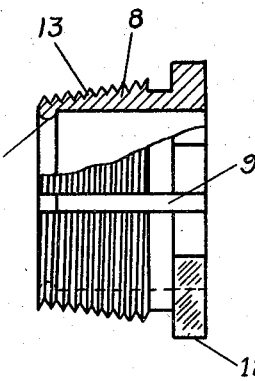

Fig. 5 an elevation, partly in section, of the contracting sleeve.

1 marks the body or wall of the box, and 2 an opening through the wall.

A sleeve 3 is arranged in the opening. This sleeve is provided with a groove 4, the walls of the groove engaging the opening 2. The sleeve is provided with a slot 5 rendering the sleeve expansible and the sleeve is provided with a wrench-hold 6 and inner screw threads 7, these screw threads being tapered.

Within the expanding sleeve 3 is a contracting sleeve 8, this sleeve being rendered contractible by a slot 9. It has a guard 10 at its inner end and is adapted to receive and clamp a conduit 11. It has a wrench-hold 12 at its outer end and tapered screw threads 13 operating in the screw threads 7.

In putting the material in place the outer expanding sleeve is passed through the opening. The inner sleeve is screwed into it. The conduit put in place and the inner sleeve set up. The effect of the tapered engaging threads of the inner and outer sleeves is to expand the outer sleeve into clamping engagement with the walls of the opening and at the same time to contract the inner sleeve into clamping engagement with the conduit so that as a final result there is a rigid union of all the parts.

What I claim as new is:—

1. In a conduit fitting, the combination of a body having a conduit opening; an expansible sleeve in the opening; a contractible sleeve in the expansible sleeve, said sleeves havig wedging surfaces in engagement and operable with a relatively axial movement of the sleeves to expand the outer sleeve and contract the inner sleeve; and means forcing the sleeves axially relative to each other.

2. In a conduit fitting, the combination of a body having a conduit opening; an expansible sleeve in the opening; a contractible sleeve in the expansible sleeve, said sleeves having wedging surfaces in engagement and operable with a relatively axial movement of the sleeves to expand the outer sleeve and contract the inner sleeve; and means forcing the sleeves axially relatively to each other comprising a screw connection between the sleeves.

3. In a conduit fitting, the combination of a body having a conduit opening; an expansible sleeve in the opening having a tapered interior screw thread; and a contractible sleeve in the expansible sleeve, said contractible sleeve having a tapered exterior screw thread engaging the screw thread of the expansible sleeves, said screw threads forming a means for effecting relative movement of the sleeve.

4. In a conduit fitting, the combination of a body having a conduit opening; an expansible sleeve in the opening, said sleeve having a groove on its outer surface, the walls of the groove engaging the walls of the opening; a contractible sleeve in the expansible sleeve, said sleeves having wedging surfaces in engagement and operable with a relatively axial movement of the sleeves to expand the outer sleeve and contract the inner sleeve; and means forcing the sleeves axially relatively to each other.

5. In a conduit fitting, the combination of a body having a conduit opening; an expansible sleeve in the opening; a contractible sleeve in the expansible sleeve, said sleeves having wedging surfaces in engagement and operable with a relatively axial movement of the sleeves to expand the outer sleeve and contract the inner sleeves and means effecting relative axial movement of the sleeve.

6. The combination of an expansible sleeve; and a contractible sleeve within the expansible sleeve, said sleeves having wedging surfaces adapted to expand the expansible sleeve and contract the contractible sleeve upon a relative endwise movement of the sleeves.

7. The combination of an expansible sleeve; a contractible sleeve within the expansible sleeve, said sleeves having wedging surfaces adapted to expand the expansible sleeve and contract the contractible sleeve upon a relative endwise movement of the sleeves; and means for forcing the sleeves endwise relatively to each other.

8. The combination of a body having an opening therein; an expansible sleeve in the opening; a contractible sleeve in the expansible sleeve; a member within the contractible sleeve; and means operating on said sleeves to expand the outer sleeve and contract the inner sleeve.

In testimony whereof I have hereunto set my hand.

FRANK J. RAYBOULD.